Feb. 19, 1957 W. J. FOLEY 2,781,641
REFRIGERATION APPARATUS DEFROSTING CONTROL
Filed Oct. 30, 1952
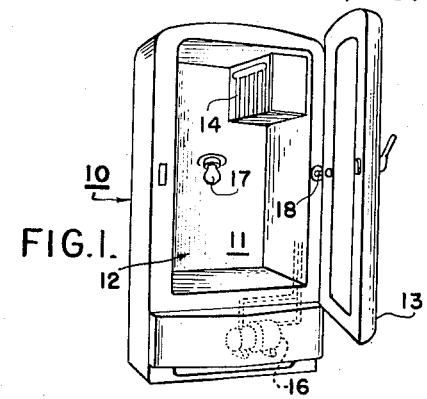
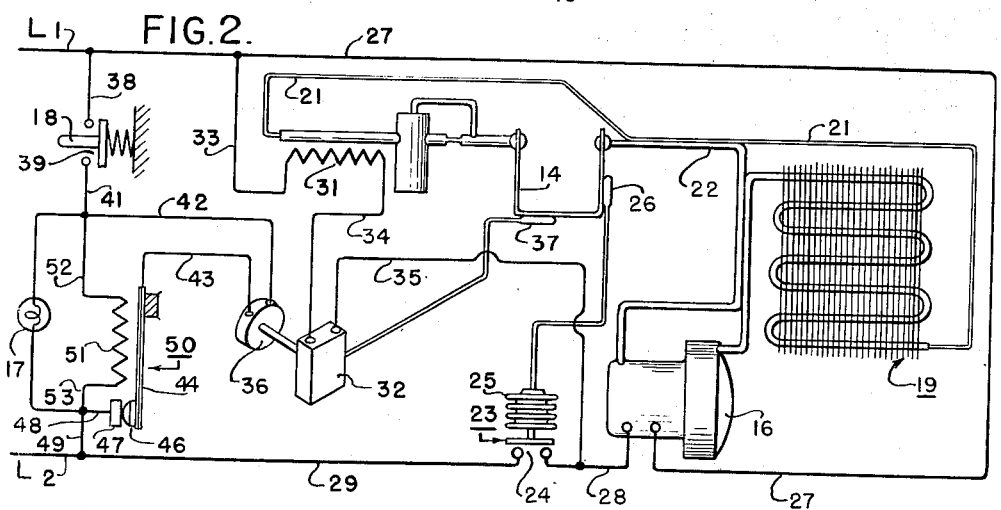
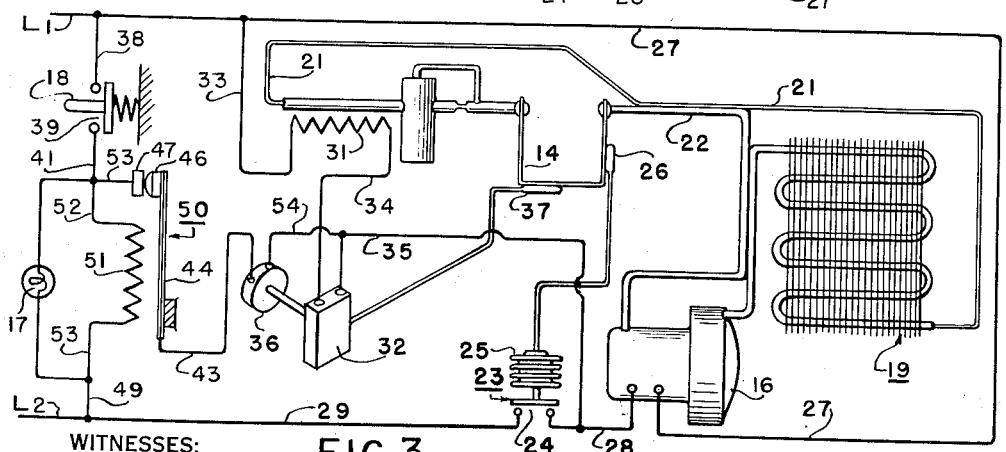
WITNESSES:
D. J. McCarty
E. H. Lutz
INVENTOR
William J. Foley
BY
ATTORNEY United States Patent Office 2,781,641
Patented Feb. 19, 1957

2,781,641

REFRIGERATION APPARATUS DEFROSTING CONTROL

William J. Foley, Ridley Park, Pa., assignor to Westinghouse Electric Corporation, East Pittsburgh, Pa., a corporation of Pennsylvania Application October 30, 1952, Serial No. 317,646

5 Claims. (Cl. 62—4)

This invention relates to control apparatus for automatically defrosting refrigerators and has for an object to provide improved protective provisions for precluding abnormal operation of the control apparatus under certain conditions.

Various schemes have in the past been devised for intermittently initiating a defrosting operation for a domestic refrigerator. In general these schemes seek to regulate the frequency of defrosting in accordance with the occurrence of factors influencing the accumulation of frost on the cooling unit of the refrigeration system. Carl F. Alsing in a U. S. patent application Serial No. 150,189, filed March 17, 1950, and now abandoned, discloses a defrost control device which measures and integrates the door open periods of the refrigerator and initiates a defrosting operation after a predetermined period of door open time. In the control device disclosed by Alsing an electric timer motor wired through a door operated switch and which runs whenever the door is open, constitutes the means for measuring the door open period.

It has also been disclosed that a more efficient regulation of defrosting may be obtained by making the defrost control device responsive conjointly to door open time and refrigerating machinery running time. This system is described and claimed by Graham S. McCloy in his pending U. S. patent application Serial No. 244,337, filed August 30, 1951, and includes an electric timer motor energized through a door actuated switch and the thermostatic switch normally employed in refrigerating apparatus to control energization of the refrigerating machinery.

In the two defrost control systems referred to above, it is possible that the timer motor may run continuously and initiate the defrosting operation at far too frequent intervals if the refrigerator door is left open, or if the door actuated switch fails in a closed position. It is, therefore, an object of this invention to prevent rapid recurrence of a defrosting operation in automatic defrosting refrigerators employing control devices which measure refrigerator operations.

Another object of this invention is to prevent rapid recurrence of the defrosting operation in an automatic defrosting refrigerator in which the defrost control system is responsive to refrigerator door openings.

A further object of this invention is to effect deenergization of the timer motor of an automatic defrosting control circuit after a predetermined interval of energization, to prevent continuous running of the timer motor such as might result from the failure of one of the components of the control system.

These and other objects are effected by my invention as will be apparent from the following description taken in connection with the accompanying drawings, forming a part of this application, in which:

Fig. 1 is a view in perspective of a refrigerator cabinet embodying the defrost control of this invention;

Fig. 2 is a schematic diagram of the defrost control of this invention and its application to refrigerating apparatus; and Fig. 3 is a schematic drawing of a modified defrost control constructed in accordance with this invention.

Referring to the drawing and more especially to Fig. 1, the reference numeral 10 designates generally a refrigerator cabinet having a food storage compartment 11. The food storage compartment 11 is provided with an access opening 12, which is closed by a door 13 movable between open and closed positions. Disposed within the upper portion of the food storage compartment 11 is a cooling unit 14 which in the ordinary domestic refrigerator takes the form of an evaporator for refrigerant fluid supplied thereto by a motor compressor unit 16 generally positioned, as shown in Fig. 1, in the lower portion of the cabinet 10. The interior of food storage compartment 11 is illuminated by an electric light 17 energized through a door operated switch which will hereinafter be described. This switch is actuated by a plunger 18 carried in one of the walls of the cabinet 10 for engagement with the door 13.

The refrigerant condensing and circulating equipment is illustrated diagrammatically in Fig. 2 and consists of the motor compressor unit 16 and a condenser 19. Refrigerant condensed by the condenser 19 is forced through a capillary tube 21 to the evaporator 14 where it evaporates and absorbs heat from the food storage compartment 11. The vaporous refrigerant is conveyed from the evaporator 14 back to the motor compressor 16 via a conduit 22, whereupon the refrigerant cycle is repeated.

The motor compressor unit 16 is intermittently energized and deenergized by a temperature control 23 to maintain an average evaporator temperature below the freezing point of water, at which temperature moisture is condensed from the air in the food storage compartment 11 and deposited on the evaporator 14 in the form of frost. The temperature control 23 is preferably of the type well known in the art and consists generally of a switch 24 which is opened and closed by a bellows 25 in response to vapor pressure changes in a control bulb 26 secured to a portion of evaporator 14. The closing of switch 24 energizes the compressor 16 from main supply leads $L_1$ and $L_2$ through conductors 27, 28 and 29.

Intermittent automatic defrosting is accomplished by the application of heat to the refrigerant entering evaporator 14 by means of an electric heater 31. The heater 31 vaporizes a portion of the refrigerant flowing in the system which thereafter condenses in the cooling unit 14, giving up heat to raise the temperature of the cooling unit 14 and melt the frost which has formed thereon. While any suitable means may be employed to apply heat to evaporator 14 to affect defrosting thereof, the defrosting system illustrated in the drawings is that which is disclosed and claimed in Patent No. 2,459,173, issued January 18, 1949, to Graham S. McCloy and assigned to the assignee of the present invention. A full description of the construction and operation of this system may be had by referring to the above mentioned patent. For the sake of brevity the particular defrosting system shown is not here described in detail inasmuch as it forms no part of the present invention.

Heater 31 is periodically energized by a defrost control switching means indicated generally at 32. Switching means 32 consists essentially of an electric switch for completion of the circuit from main supply lead $L_1$ through conductor 33, heater 31, through conductors 34, 35 and 28, switch 24, conductor 29, to supply lead $L_2$. Switching means 32 is actuated to its closed position to energize heater 31 by a timer motor 36 and is opened to deenergize heater 31 and terminate the defrosting operation by a thermostatic control device 37 attached to a portion of the evaporator 14. A switching arrangement particularly adapted to perform the function of switching means 32 is disclosed in U. S. patent application of Graham S. McCloy Serial No. 244,337, filed August 30, 1951, and assigned to the assignee of the present invention. Since the structural details of such switching means per se form no essential part of the present invention, a discussion thereof is deemed unnecessary in this application.

An electrical supply circuit for timer motor 36 is provided and includes a conductor 38 connecting main supply lead L1 with a switch 39, conductors 41 and 42 connecting switch 39 to timer motor 36, a conductor 43, a bimetal thermal element 44, contacts 46 and 47 and conductors 48 and 49 to main supply lead L2. Switch 39 is actuated through plunger 18 by the opening and closing of door 13 and is biased to a closed position such that it completes the circuit to timer motor 36 each time door 13 is moved to its open position. Switch 39 also functions to control the cabinet light 17.

It will thus be apparent that timer motor 36 is energized each time door 13 is opened and the number of revolutions made by motor 36 will depend upon the length of time that door 13 remains open. After motor 36 has completed a predetermined number of revolutions, indicating that the door 13 has been open for a predetermined elapsed period of time, the motor 36 drives switch means 32 to its circuit closed position energizing heater 31 to initiate defrosting, as has previously been described.

It is possible that the user of the refrigerator will fail to close the door 13 completely or that switch 39 will remain in closed position even though door 13 is closed. In either of these events, the timer motor 36 would run continuously and effect defrosting at entirely too frequent intervals. For this reason, a protective device 50 is provided in the timer motor supply circuit. In accordance with this invention, this protecting device takes the form of the temperature sensitive bimetal element 44, previously referred to, and contacts 46 and 47 associated therewith. The bimetal element 44 is heated for the separation of contacts 46 and 47 and the deenergization of motor 36 by means of an electric heater 51. Heater 51 is energized simultaneously with timer motor 36 from main supply leads L1 and L2 through an electrical circuit comprising conductor 38, switch 39 and conductors 41, 52, 53 and 49.

It is desirable to deenergize timer motor 36 only when the door switch 39 remains closed for an abnormally long period of time. Bimetal element 44 is, therefore, designed to have an operating period in excess of the period of time that the refrigerator door is normally held open by the user in gaining access to the food stored within the refrigerator. Since a refrigerator door is not normally left open for more than a minute during any one open period, most normal door openings will be recorded by timer motor 36 if bimetal element 44 and its associated heater 51 are designed to separate contacts 46 and 47 after heater 51 is energized for a period exceeding approximately one minute.

Once bimetal 44 separates contacts 46 and 47 timer motor 36 remains deenergized until heater 51 is deenergized by the closing of the refrigerator door 13 or switch 39 is manually opened by a serviceman if the switch itself has failed in closed position.

Modification

Fig. 3 of the drawing illustrates a modified defrost control arrangement embodying this invention in which defrosting is initiated in response conjointly to door open time and refrigerating machinery running time. Those elements of the system which are the same as the previously described embodiment are indicated by like reference numerals.

As shown in Fig. 3, the principal change in the circuit from the previously described embodiment consists of connecting the supply circuit for the timer motor 36 through the temperature control switch 24 controlling energization of the motor compressor unit 16. The modified timer motor supply circuit may be traced as follows: From main supply L1 through conductor 38, switch 39, conductors 41 and 53, contacts 46 and 47, bimetallic element 44, conductor 43 to timer motor 36, through conductors 54, 35 and 28 to switch 24 and through conductor 29 to the supply lead L2.

An examination of this circuit will reveal that the timer motor 36 is energized only when both the door operated switch 39 and temperature control switch 24 are closed. After the refrigerator door 13 has been open during running periods of the motor compressor unit 16 a predetermined elapsed period of time, as reflected by a predetermined number of revolutions of the timer motor 36, defrost control switching means 32 is actuated by the timer motor 36 to energize defrost heater 31, thereby initiating a defrosting operation.

Heater 51 of the protective device 50 is, as in the previously described embodiment of the invention, connected serially with door operated switch 39 and energized each time door 13 is moved to its open position. Bimetallic element 44 of protective device 50 will, therefore, be heated by heater 51 and separate contacts 46 and 47 to deenergize timer motor 36 whenever door operated switch 39 remains closed for a period in excess of approximately one minute. This limitation on the length of the individual periods of energization of the timer motor 36, as imposed thereon by protective device 50, prevents continuous running of timer motor 36 and rapid recurrence of a defrosting operation even though door operated switch 39 remains in its closed position.

From the foregoing, it will be apparent that the control systems herein disclosed constitute an inexpensive, yet effective, means for preventing rapid recurrence of defrosting operations in automatic defrosting refrigerators employing a timer motor control circuit.

While the invention is shown in several forms, it will be obvious to those skilled in the art that it is not so limited, but is susceptible of various other changes and modifications without departing from the spirit thereof.

What I claim is:

1. In a refrigerator having a cabinet with an access opening therein, a door for opening and closing said opening, a cooling element for refrigerating media in said cabinet, refrigerating machinery for circulating refrigerant through said cooling element, means for heating said cooling element to remove frost therefrom, control mechanism for said heating means including a timer motor and means for energizing said heating means after a predetermined period of operation of said timer motor, a supply circuit for said timer motor, said supply circuit including first and second switches, said first switch being actuated to a closed position in response to opening of said door, and means in said supply circuit for measuring the individual periods of time during which said first switch is in its closed position and for opening said second switch in the event one of the closed periods of said first switch exceeds a predetermined interval of time.

2. In a refrigerator having a cabinet with an access opening therein, a door for opening and closing said opening, a cooling element for refrigerating media in said cabinet, refrigerating machinery for circulating refrigerant through said cooling element, means for heating said cooling element to remove frost therefrom, control mechanism for said heating means including a timer motor and means for energizing said heating means after a predetermined period of operation of said timer motor, a supply circuit for said timer motor, said supply circuit including first and second switches, said first switch being actuated to a closed position in response to opening of said door, and means in said supply circuit for opening said second switch after said first switch has been closed a predetermined period of time, said last named means comprising a temperature sensitive element for actuating said second switch and a heater energized by said first switch for raising the temperature of said temperature sensitive element.

3. In a refrigerator having a cabinet with an access opening therein, a door for opening and closing said opening, a cooling element for refrigerating media in said cabinet, refrigerating machinery for circulating refrigerant through said cooling element, means for heating said cooling element to remove frost therefrom, control mechanism for said heating means including a timer motor and means for energizing said heating means after a predetermined period of operation of said timer motor, a supply circuit for said timer motor, said supply circuit including switching means actuated to a closed position in response to the opening of said door for controlling energization of said timer motor, timing means energized simultaneously with said timer motor, and means actuated by said timing means for deenergizing said timer motor after a predetermined period of energization of said timing means, the construction and arrangement being such that the individual operating periods of said timer motor are limited to a predetermined maximum duration.

4. In a refrigerator having a cabinet with an access opening therein, a door movable for opening and closing said opening, a cooling element for refrigerating media in said cabinet, refrigerating machinery for circulating refrigerant through said cooling element, a thermostatically-operated switch responsive to the temperature within the cabinet for energizing and deenergizing said refrigerating machinery, a door-operated switch actuated to a closed position in response to opening of said door, means for heating said cooling element to remove frost therefrom, a control mechanism for said heating means including a timer motor and means for energizing said heating means after a predetermined period of operation of the timer motor, a supply circuit for said timer motor including said thermostatically-operated switch and said door operated switch, the arrangement being such that said timer motor is energized only when said refrigerating machinery is energized and said door is open, and means for limiting the duration of the individual operating periods of said timer motor, said last named means comprising a switch in the timer motor supply circuit and timing means energized simultaneously with said timer motor for opening said circuit switch after a predetermined period of energization of said timing means.

5. In a refrigerator having a cabinet with an access opening therein, a door movable for opening and closing said opening, a cooling element for refrigerating media in said cabinet, refrigerating machinery for circulating refrigerant through said cooling element, a thermostatically-operated switch responsive to the temperature within the cabinet for energizing and deenergizing said refrigerating machinery, a door-operated switch actuated to a closed position in response to opening of said door, means for heating said cooling element to remove frost therefrom, a control mechanism for said heating means including a timer motor and means for energizing said heating means after a predetermined period of operation of the timer motor, a supply circuit for said timer motor including said thermostatically-operated switch and said door operated switch, the arrangement being such that said timer motor is energized only when said refrigerating machinery is energized and said door is open, and means for limiting the duration of the individual operating periods of said timer motor, said last named means comprising a switch in the timer motor supply circuit, temperature sensitive means for actuating said switch and a second heating means energized by the closing of said door operated switch for raising the temperature of said temperature sensitive means to open said switch a predetermined period of time after said second heating means is energized.

References Cited in the file of this patent

UNITED STATES PATENTS

| | | |
|---|---|---|
| 1,773,356 | Frost | Aug. 19, 1930 |
| 1,790,485 | Raney | Jan. 27, 1931 |
| 2,091,884 | Rattner | Aug. 31, 1937 |
| 2,423,316 | Holmes | July 1, 1947 |
| 2,463,027 | Frie | Mar. 1, 1949 |
| 2,595,967 | McCloy | May 6, 1952 |
| 2,612,026 | Hansen | Sept. 30, 1952 |
| 2,701,450 | Duncan | Feb. 8, 1955 |